United States Patent [19]

Ranby et al.

[11] 4,026,816

[45] May 31, 1977

[54] CERIUM AND TERBIUM ACTIVATED ALUMINATE PHOSPHORS

[75] Inventors: Peter Whitten Ranby; Doreen Yvonne Hobbs, both of London, England

[73] Assignee: Thorn Electrical Industries Limited, London, England

[22] Filed: Jan. 17, 1975

[21] Appl. No.: 540,804

[30] Foreign Application Priority Data

Jan. 17, 1974 United Kingdom ............... 2279/74

[52] U.S. Cl. .................. 252/301.6 R; 252/301.4 R
[51] Int. Cl.² ....................................... C09K 11/46
[58] Field of Search .............. 252/301.6 R, 301.4 R

[56] References Cited

UNITED STATES PATENTS 3,723,339  3/1973  Wanmaker et al. ........ 252/301.6 R

FOREIGN PATENTS OR APPLICATIONS 2,353,943  5/1974  Germany ..................... 252/301.4 R
267,784  7/1970  U.S.S.R. ..................... 252/301.4 R

OTHER PUBLICATIONS

Verstegen et al. "J. of Lumin" 6(5), 1973 pp. 425–431 (Chem. Abstract–vol. 79, 1973, 141148).

*Primary Examiner*—Jack Cooper

*Attorney, Agent, or Firm*—Robert F. O'Connell; David G. Conlin

[57] ABSTRACT

Phosphors having useful fluorescent emission properties comprise aluminates of magnesium, zinc and/or lithium having an hexagonal or so-called "β-alumina" crystal structure and activated by cerium and terbium. In preferred phosphors the ratio of Mg:Al is from 0.01 to 0.5:1, Ce:Al from 0.001 to 0.1:1 and Tb:Al from 0.005:1 to 0.25:1. Where zinc or lithium wholly or partially replace the magnesium, chemically equivalent amounts may be used. A particularly useful phosphor conforms substantially to the approximate formula $(Ce,Tb)_1 Mg_{1-2}Al_{22}O_x$, where $x$ is the number of atoms of oxygen required to satisfy the valencies of the metals. The invention also provides a valuable process for the preparation of such aluminate phosphors, giving a product of fine grain which may not require milling or other severe grinding (which is expensive and tends to harm emission properties) to bring it into the preferred particle size range for lamp manufacture. In this process the source of alumina is aluminium ammonium sulphate (ammonium alum) and this is mixed with oxides of the other constituent metals (or decomposable compounds thereof) and fired at temperatures above 1200° C and preferably at 1450° C and even higher. An increase in brightness may be obtained by a final heating in hydrogen in the region of 1050° C.

7 Claims, 1 Drawing Figure

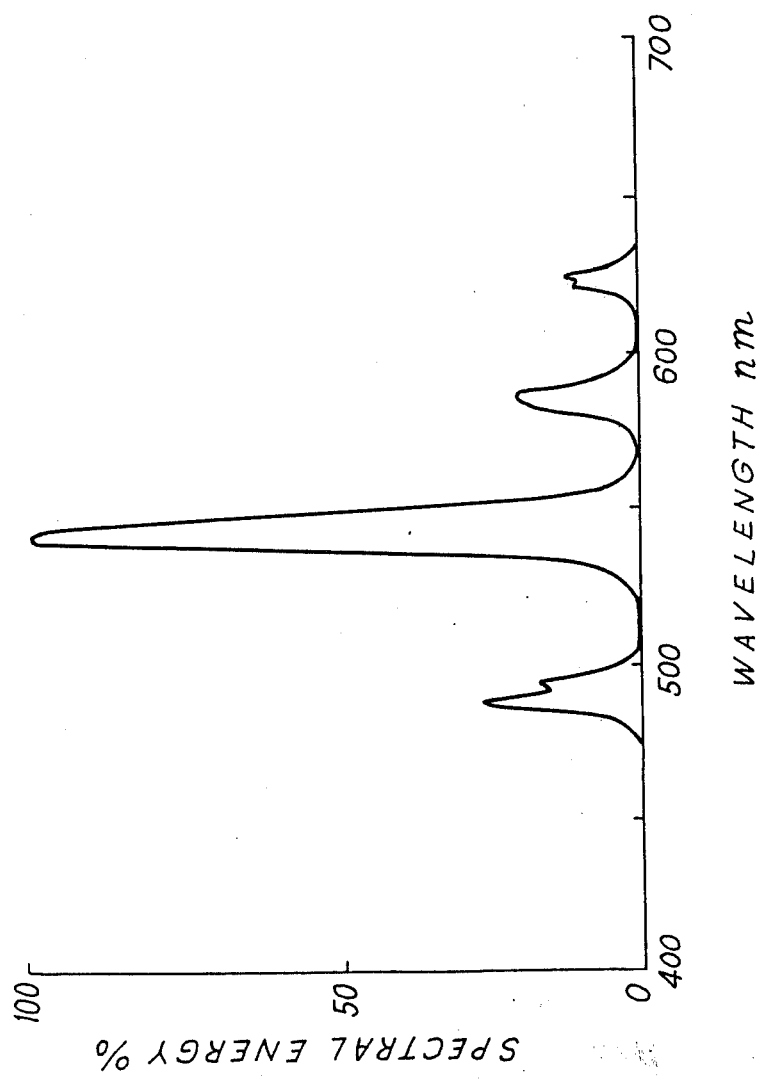

CERIUM AND TERBIUM ACTIVATED ALUMINATE PHOSPHORS

The present invention relates to new phosphors for use in lamps and cathode ray tubes, and to their method or preparation and use.

The phosphors according to this invention are aluminates of lithium, magnesium and/or zinc, having a hexagonal or so-called "β-alumina" crystal structure and being activatable by cerium and terbium.

The nomenclature of these materials may at first sight appear confusing because originally it was thought that aluminium oxide, i.e. alumina, existed in a number of discrete crystalline forms called α-, β-, γ- etc. However, it was eventually established that the form recognised as β-alumina was a structure stabilized by the presence of a small quantity of an alkali or alkaline earth metaloxide and so the so-called β-alumina was in reality a metal aluminate in which the non-aluminium metal ion was in low concentration e.g. the composition of typical aluminates of this type can be represented as $1K_2O: 11Al_2O_3$; i.e. $K_2Al_{22}O_{34}$
$1CaO:6Al_2O_3$; i.e. $CaAl_{12}O_{19}$ An indication of the somewhat confused situation which has existed in the past is that the official names for the compound composed of $1Na_2O:11Al_2O_3$ adopted by Chemical Abstracts were from 1947 to 1956 "β-alumina", from 1956 to 1966 "sodium aluminate", and since 1966 "aluminium sodium oxide", $Al_{11}NaO_{17}$. These materials have a hexagonal crystal structure.

In the preferred phosphors of this invention, the atomic ratios of the constituent metals lie within the following ranges:

| Divalent metal (Mg and/or Zn) : Al | |
|---|---|
| | from 0.01:1 to 0.5:1 |
| Ce : Al | from 0.001:1 to 0.1:1 |
| Tb : Al | from 0.005:1 to 0.25:1 |

In the case of phosphors containing the monovalent metal lithium, part or all of the divalent metal is replaced by the chemically equivalent proportion of lithium.

More especially preferred phosphors according to the invention conform substantially to the general formula

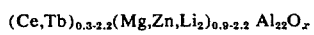
$(Ce,Tb)_{0.3-2.2}(Mg,Zn,Li_2)_{0.9-2.2} Al_{22}O_x$ where $x$ is the number of atoms of oxygen required to satisfy the valencies of the constituent metals, calculated on the basis of trivalent cerium, terbium and aluminium, divalent magnesium and zinc and monovalent lithium.

We find that the phosphors according to this invention are of particular value because, when excited, the fluorescent emission appears as a number of fairly narrow discrete bands and such emission bands are particularly important in the manufacture of modern fluorescent and discharge lamps of high efficiency and good colour. One feature of the fluorescent emission from these phosphors which is of particular value is that the intensity of the emission remains high even when the temperature of the phosphor is increased above room temperature. This is of value because in some types of high intensity fluorescent lamps and in certain types of mercury discharge lamp the phosphor coating may have to operate at high temperatures, in some cases up to several hundred degrees centigrade.

An important and further aspect of this invention is a preferred method of making hexagonal aluminate phosphors and more especially those defined above.

In some applications phosphor particles must be of small size, often referred to as of microcrystalline particle size, and of carefully controlled particle size distribution. One commonly preferred particle size range for lamp manufacture is between 3 and 30 microns. However, many phosphors when initially produced by conventional methods require expensive and usually deleterious milling and particle sizing techniques to reduce the phosphor to the optimum particle size for its application to lamps. This is, for example, the case with the halophosphates.

We have found that the hexagonal aluminate phosphors are sensitive to milling and other severe grinding operations and we have devised a method of preparation which produces a product of a finely divided character which does not necessarily require harmful size reduction processing. Thus the product may only require a relatively mild grinding operation to break down agglomerates, rather than a severe milling of the kind required if the ultimate particle size had to be substantially reduced.

The method of producing phosphors according to this invention comprises heating a mixture of aluminium ammonium sulphate and the oxides of other component metals (or compounds which thermally decompose to such oxides and volatile components) in the appropriate proportions to a temperature above 1200° C and preferably to 1450° C or even higher. In the following examples both firing processes are carried out at 1450° C, but these phosphors may also be prepared by firing first at a lower temperatures, e.g. in the range 1000°-1100° C, and then using a higher temperature such as 1450° C for a second firing process. As is usual in the preparation of phosphors, high purity starting materials should be used.

The advantageous use of aluminium ammonium sulphate - usually ammonium alum $AlNH_4(SO_4)_2 12H_2O$ — as a starting material for the purposes of our invention is surprising since it is well known that ν-alumina is produced when ammonium alum is heated to a temperature at which it decomposes. We have found that if one seeks to prepare high purity finely divided ν-alumina in this way but in the presence of another metal oxide such as that of lithium, magnesium, or zinc and the phosphor activators, cerium and terbium, the aluminate phosphors of the present invention result and have the hexagonal β-alumina structure.

After the heating, the product can be ground and reheated and the resultant phosphor is a fine powder which can be used without further treatment. However, the product can be washed in water, dried and sieved or elutriated if required.

We have observed that high brightness phosphors are obtained by heating the component materials together in air at a temperature of 1450° or above, but we have further found that by reheating a bright phosphor in an atmosphere of hydrogen even at a temperature of only 1000°-1100° C a slightly improved intensity of fluorescence is obtained.

The following examples will serve to illustrate the practice of the invention:

EXAMPLE 1

10 g ammonium alum $AlNH_4(SO_4)_2 12H_2O$
0.1g zinc oxide
0.2g cerous nitrate $Ce(NO_3)_3 6H_2O$
0.1g terbium oxide are ground together and then heated in an alumina crucible for 1 hour at 1450° C in air. When cool the product is ground and refired for another hour at 1450° C as before.

When cool, the final product is a finely divided white powder corresponding to the formula $Ce_{0.47}Tb_{0.53}Zn_{1.25}Al_{22}O_x$ which when irradiated with short wave U.V. (e.g. 253.7nm) emits a bright greenish yellow. This visual appearance is due to the emission being composed of a number of relatively narrow discrete bands, as shown by the spectrum constituting the accompanying drawing. The phosphor emits a greenish yellow fluorescence under cathode rays.

EXAMPLE 2

If the method of Example 1 is modified by replacing the 0.1g zinc oxide by 0.07g lithium carbonate, a phosphor with a similar bright greenish yellow fluorescence is obtained. It corresponds to the formula $Ce_{0.47}Tb_{0.53}Li_{1.9}Al_{22}O_x$.

EXAMPLE 3

If the method of Example 1 is modified by replacing 0.1g zinc oxide by 0.05g magnesium oxide, a phosphor with a similar bright greenish yellow fluorescence is obtained. It corresponds to the formula $Ce_{0.47}Tb_{0.53}Mg_{1.24}Al_{22}O_x$.

EXAMPLE 4

If the method of Example 1 is modified by replacing the 0.1g zinc oxide by 0.05g zinc oxide and 0.035g lithium carbonate, a phosphor with a similar moderately bright greenish yellow fluorescence is obtained. It corresponds to the formula $Ce_{0.47}Tb_{0.53}Li_{0.95}Zn_{0.63}Al_{22}O_x$.

EXAMPLE 5

100 grams ammonium alum, $AlNH_4(SO_4)_2 12H_2O$
0.8 gram magnesium oxide MgO
2.0 gram cerous nitrate $Ce(NO_3)_3 6H_2O$
1.0 gram terbium oxide $Tb_4O_7$ are ground together and then heated in an open crucible in air for ½ hour at 1050° C. After grinding the product is refired for 1 hour at 1500° C in air, ground and refired for a further 1½ hours at 1500° in air. When cold the product is ground and refired for half an hour at 1050° C in a slow stream of hydrogen.

The final product has an average particle size of 12 microns and shows a bright greenish yellow fluorescence. The formula of this product is $Ce_{0.47}Tb_{0.53}Mg_2Al_{22}O_x$.

We claim:

1. A luminescent material having the following formula:

$$(Ce, Tb)_z A_y Al_{22} O_x$$

wherein $z$ is the combined total amount of cerium and terbium and has a value of about 1; A is selected from Mg, Zn, $Li_2$ and mixtures thereof; $y$ has a value of from about 0.9–2.2; and $x$ is the number of atoms of oxygen required to satisfy the valencies of the constituent metals, calculated on the basis of trivalent Ce, Tb and Al, divalent Mg and Zn, and monovalent Li; said material having a hexagonal or "B-alumina" crystal structure, and having an ultimate particle size as prepared and without harmful milling, of about 3 to 30 microns, said cerium and terbium being present in a ratio of about 0.47 atoms of cerium per 0.53 atoms of terbium.

2. A luminescent material according to claim 1 having the formula $$Ce_{0.47} Tb_{0.53} Zn_{1.25} Al_{22} O_x$$

3. A luminescent material according to claim 1 having the formula $$Ce_{0.47} Tb_{0.53} Li_{1.9} Al_{22} O_x$$

4. A luminescent material according to claim 1 having the formula $$Ce_{0.47} Tb_{0.53} Mg_{1.24} Al_{22} O_x$$

5. A luminescent material according to claim 1 having the formula $$Ce_{0.47} Tb_{0.53} Li_{0.95} Zn_{0.63} Al_{22} O_x$$

6. A luminescent material according to claim 1 having the formula $$Ce_{0.47} Tb_{0.53} Mg_2 Al_{22} O_x$$

7. The luminescent material of claim 1, having the chemical formula:

$$(Ce, Tb)_1 Mg_{1-2} Al_{22} O_x$$

* * * * *